United States Patent
Bae

(10) Patent No.: US 10,428,881 B2
(45) Date of Patent: Oct. 1, 2019

(54) BLOW BACK PREVENTION DEVICE, AND ASSOCIATED METHOD

(71) Applicant: THE BOEING COMPANY, Huntington Beach, CA (US)

(72) Inventor: Kwan-Ho Bae, Mukilteo, WA (US)

(73) Assignee: The Boeing Company, Huntington Beach, CA (US)

( * ) Notice: Subject to any disclaimer, the term of this patent is extended or adjusted under 35 U.S.C. 154(b) by 765 days.

(21) Appl. No.: 15/069,579

(22) Filed: Mar. 14, 2016

(65) Prior Publication Data
US 2017/0261048 A1    Sep. 14, 2017

(51) Int. Cl.
| | |
|---|---|
| *F16D 43/02* | (2006.01) |
| *F16D 15/00* | (2006.01) |
| *F16D 67/02* | (2006.01) |
| *B64C 13/28* | (2006.01) |
| *F16D 127/00* | (2012.01) |

(52) U.S. Cl.
CPC .............. *F16D 43/02* (2013.01); *B64C 13/28* (2013.01); *F16D 15/00* (2013.01); *F16D 67/02* (2013.01); *F16D 2127/004* (2013.01); *F16D 2300/12* (2013.01); *F16D 2300/18* (2013.01); *Y02T 50/44* (2013.01)

(58) Field of Classification Search
CPC ......... B64C 13/28; F16D 43/02; F16D 15/00; F16D 2300/18; F16D 2127/004; F16D 2300/12
See application file for complete search history.

(56) References Cited

U.S. PATENT DOCUMENTS

| | | | |
|---|---|---|---|
| 5,299,666 | A | 4/1994 | Lang et al. |
| 5,353,901 | A | 10/1994 | Jacques et al. |
| 5,944,148 | A | 8/1999 | Bae et al. |

FOREIGN PATENT DOCUMENTS

| | | |
|---|---|---|
| EP | 0878635 A1 | 11/1998 |
| EP | 2436952 A2 | 4/2012 |

OTHER PUBLICATIONS

European Search Report for Application No. 17159453.4 dated Aug. 16, 2017.

*Primary Examiner* — Brian M O'Hara
*Assistant Examiner* — Michael B. Kreiner
(74) *Attorney, Agent, or Firm* — Womble Bond Dickinson (US) LLP

(57) ABSTRACT

An aircraft flap blow back prevention device includes a first ball-ramp plate, and output coupling engaged therewith, rotatable about an axis. A second ball-ramp plate is disposed adjacent the first plate such that ball-ramp surfaces thereof are opposed, with a ball therebetween, and such that first and second braking surfaces thereof oppose respective first and second stationary braking structures. A spring biasing the first plate toward the second plate spaces apart the first braking surface and first braking structure. An input shaft axially extends through the first and second plates in a lost window arrangement, wherein an absolute value of rotational torque applied to the output coupling, greater than rotational torque applied to the input shaft, causes the ball to urge apart the plates and the braking surfaces thereof to be urged against the respective braking structures to cease rotation of the output coupling. An associated method is also provided.

18 Claims, 6 Drawing Sheets

BLOW BACK PREVENTION DEVICE, AND ASSOCIATED METHOD

BACKGROUND

Field of the Disclosure

The present disclosure is directed to a passive blow back prevention device for preventing reverse rotation of a torque-transmitting rotatable shaft such as that implemented to deploy and retract an aircraft flap.

Description of Related Art

An aircraft may include one or more flaps 2 in a trailing edge flap system 1 (see, e.g., FIG. 1A). Generally, each such flap 2 may include multiple geared rotary actuators (GRAs) and, in such instances, the outboard GRA 3 support load may be significantly higher than the inboard GRA 4 support load.

As such, the main blow back prevention device 5 ("main no-back") for the inboard GRA 4 may be designed with a relatively high gain to prevent blow back of the trailing edge of the flap 2 in the event of an operational issue with the main no-back 6 of the outboard GRA 3, combined with a disconnect of a torque tube 7 disposed inboard of the inboard GRA 4 (see, e.g., FIG. 1B).

However, a high gain no-back device may cause system chatter and/or a lock-up of the flap drive system. A lower gain no-back device may reduce or eliminate system chatter, but may not provide adequate blow back prevention in instances of the operational condition previously described.

As such, in some instances, a supplemental blow back prevention device 10 ("half-system no-back") may be provided. Generally, a conventional half system no-back 10 may include a ratchet and multiple skewed roller friction plate constant drag device.

In light of the state of the art, there exists a need for a supplemental blow back prevention device, for example, for a trailing edge flap system, that addresses issues such as size/compactness, weight, complexity and number of components, cost active versus passive operation, and capability of providing an indicium of issues with the trailing edge flap system without requiring a complex inspection procedure, any or all of which may be lacking in conventional arrangements using conventional blow back prevention devices.

SUMMARY OF THE DISCLOSURE

The above and other needs are met by aspects of the present disclosure which, in one aspect, provides a blow back prevention device for a trailing edge of an aircraft flap, wherein such a device comprises a first ball-ramp plate engaged with an output coupling, wherein the output coupling is adapted to receive a rotatable output shaft, and wherein the output coupling is rotatable with the first ball-ramp plate about a longitudinal rotation axis.

The first ball-ramp plate has a first ball-ramp surface and an opposed first braking surface. A second ball-ramp plate has a second ball-ramp surface and an opposed second braking surface. The second ball-ramp plate is disposed adjacent to the first ball-ramp plate such that the first and second ball-ramp surfaces are opposed to each other, wherein a ball disposed between the first and second ball-ramp surfaces, and wherein each of the first and second braking surfaces is opposed to a respective first and second stationary braking structure.

A spring biases the first ball-ramp plate toward the second ball-ramp plate so as to space the first braking surface apart from the first stationary braking structure. An input shaft is opposed to the output coupling and extends along the rotation axis through the first and second ball-ramp plates in a lost window arrangement therewith.

The lost window arrangement is configured such that an absolute value of a rotational torque applied to the output coupling by blow back of the flap, greater than a rotational torque applied to the input shaft, causes the ball to urge apart the first and second ball-ramp surfaces and overcome the biasing of the spring, such that the first and second braking surfaces are urged against the respective first and second stationary structures to cease rotation of the output coupling due to the rotational torque applied thereto by blow back of the flap.

Another aspect of the present disclosure provides a method of manufacturing a blow back prevention device for a trailing edge of an aircraft flap, wherein such a method comprises disposing a first ball-ramp plate adjacent to a second ball-ramp plate within a housing. The first ball-ramp plate is engaged with an output coupling adapted to receive a rotatable output shaft.

The output coupling is rotatable with the first ball-ramp plate about a longitudinal rotation axis. The first and second ball-ramp plates have respective first and second ball-ramp surfaces and opposed respective first and second braking surfaces, wherein the first and second ball-ramp surfaces are opposed to each other, and wherein each of the first and second braking surfaces is opposed to a respective first and second stationary braking structure associated with the housing.

A ball is disposed between the first and second ball-ramp surfaces, and a spring is engaged in communication with the first ball-ramp plate to bias the first ball-ramp plate toward the second ball-ramp plate, and to space apart the first braking surface from the first stationary braking structure. An input shaft is arranged along the rotation axis, in opposition to the output coupling, to extend through the first and second ball-ramp plates in a lost window arrangement therewith.

The lost window arrangement is configured such that an absolute value of a rotational torque applied to the output coupling by blow back of the flap, greater than a rotational torque applied to the input shaft, causes the ball to urge apart the first and second ball-ramp surfaces, and overcome the biasing of the spring, such that the first and second braking surfaces are urged against the respective first and second stationary structures to cease rotation of the output coupling due to the rotational torque applied thereto by blow back of the flap.

The aspects, functions and advantages discussed herein may be achieved independently in various example implementations/aspects or may be combined in yet other example implementations/aspects, further details of which may be seen with reference to the following description and drawings.

BRIEF DESCRIPTION OF THE DRAWINGS

Figure 1A:
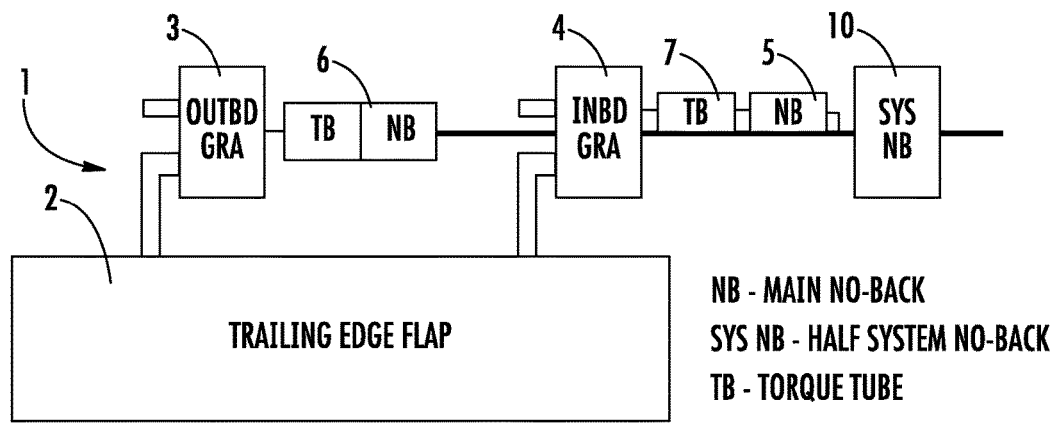
Figure 1B:
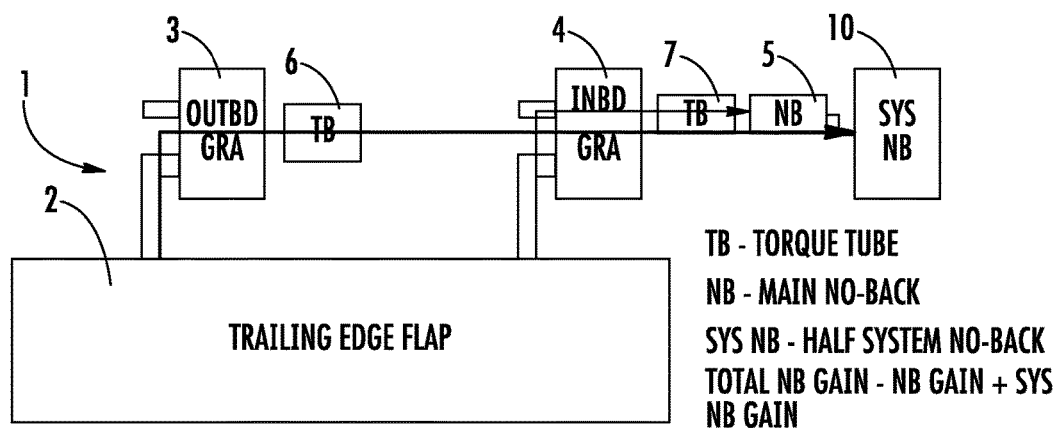
Figure 5:
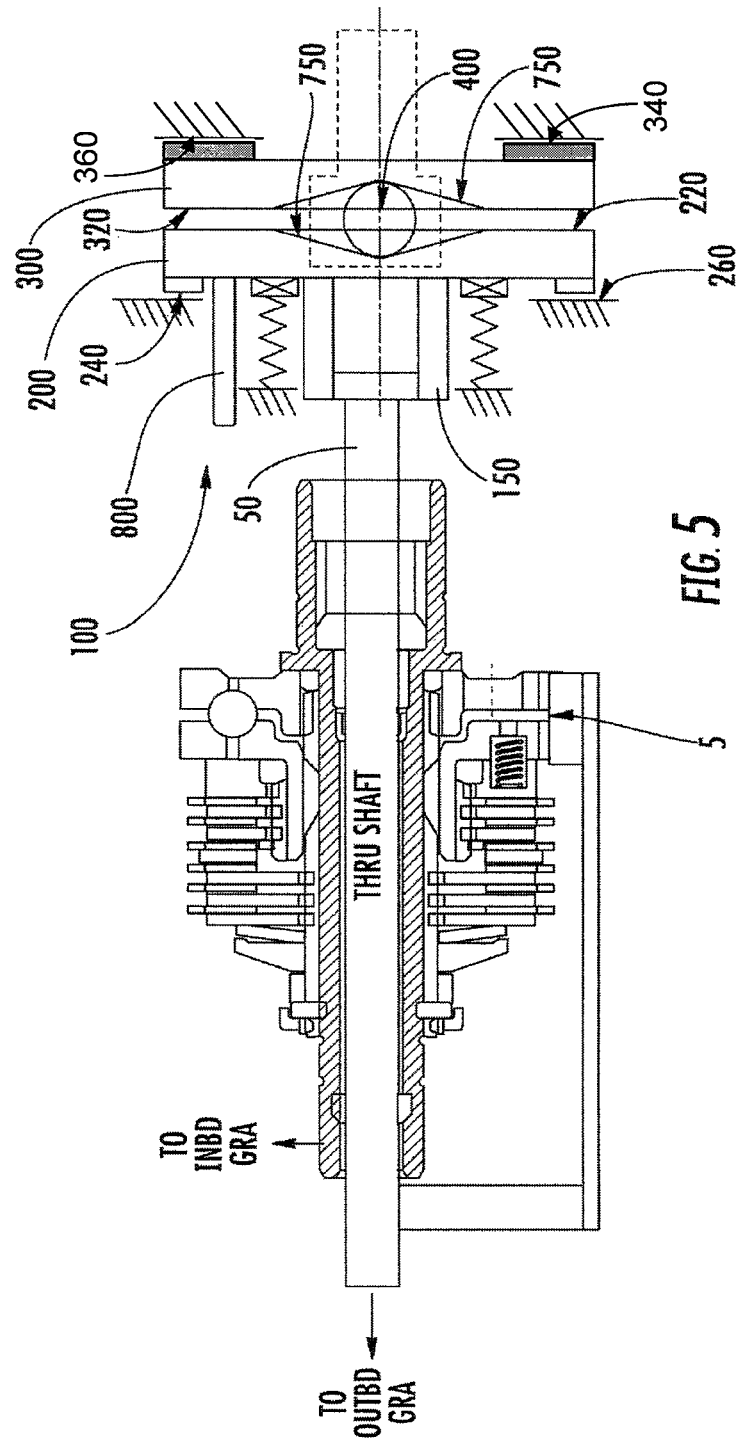
Figure 6:
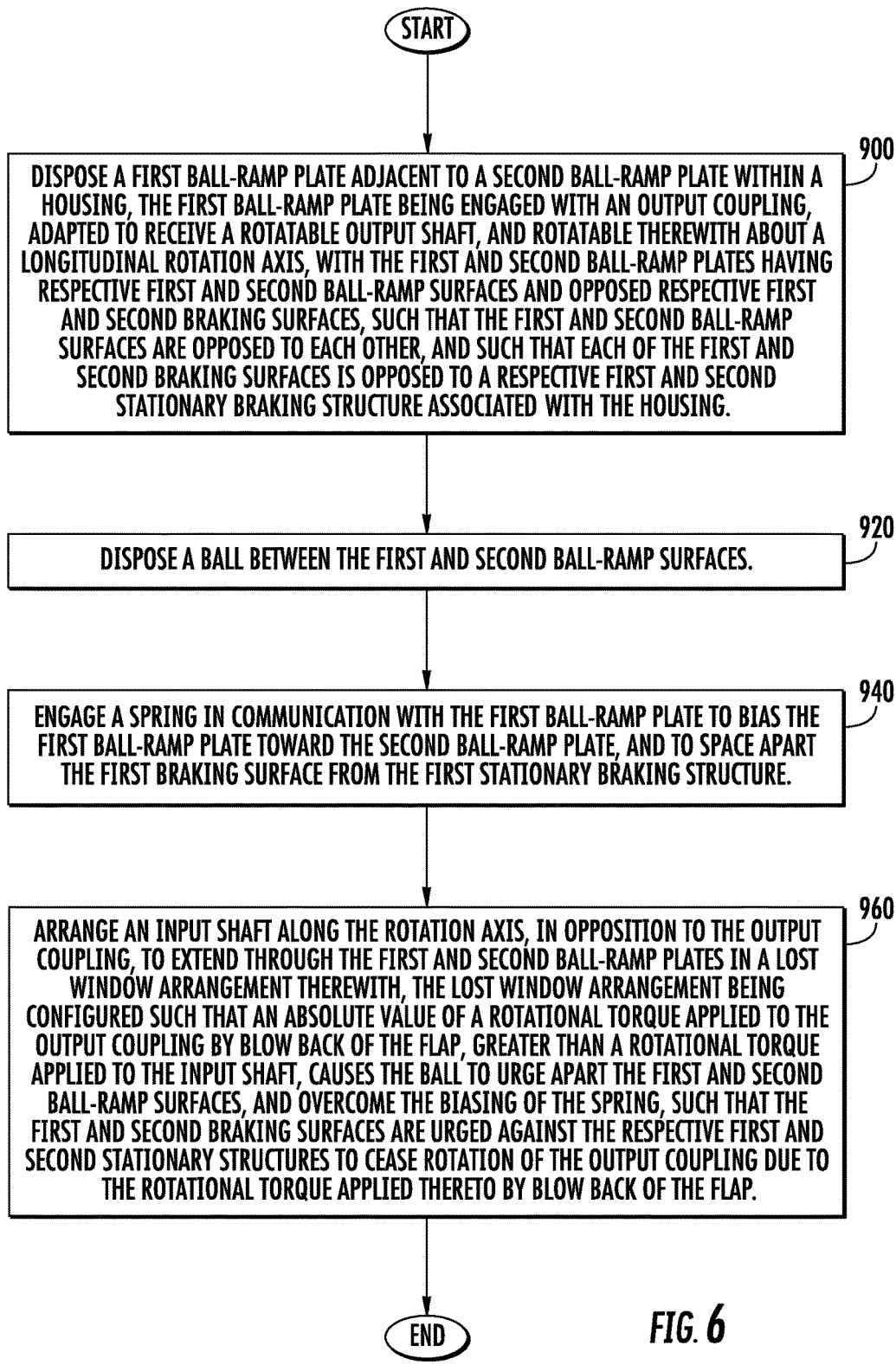

Having thus described the disclosure in general terms, reference will now be made to the accompanying drawings, which are not necessarily drawn to scale, and wherein:

FIGS. 1A and 1B schematically illustrate a trailing edge flap system implemented in an aircraft;

FIGS. 2A, 2B, 3 and 4 schematically illustrate a blow back prevention device for a trailing edge flap system, according to one aspect of the present disclosure;

FIG. 5 schematically illustrates a blow back prevention device for a trailing edge flap system, according to one aspect of the present disclosure, implemented as a supplemental passive blow back prevention device in combination with a primary blow back prevention device; and FIG. 6 schematically illustrates a method of manufacturing a blow back prevention device, according to one aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

As schematically illustrated in FIGS. 2A, 2B, 3, and 4, various aspects of the present disclosure provide a blow back prevention device 100 for an aircraft flap. Such a blow back prevention device 100 may comprise a first ball-ramp plate 200 engaged with an output coupling 150, wherein the output coupling 150 is adapted to receive a rotatable output shaft 50 in communication with the flap to deploy and retract the flap. The output coupling 150 is rotatable with the first ball-ramp plate 200 about a longitudinal rotation axis 75. Accordingly, rotation of the first ball-ramp plate 200 with the output coupling 150, in turn, deploys or retracts the flap. The first ball-ramp plate 200 also includes a first ball-ramp surface 220 and an opposed first braking surface 240, with both surfaces 220, 240 being oriented perpendicularly to the rotation axis 75.

A second ball-ramp plate 300 has a second ball-ramp surface 320 and an opposed second braking surface 340. The second ball-ramp plate 300 is disposed adjacent to the first ball-ramp plate 200, within a housing 25, such that the first and second ball-ramp surfaces 220, 320 are opposed to each other. As such, both the second ball-ramp and second braking surfaces 320, 340 of the second ball-ramp plate 300 are also oriented perpendicularly to the rotation axis 75. In addition, at least one ball 400 (i.e., a ball bearing) is disposed between the first and second ball-ramp surfaces 220, 320.

In the first and second ball-ramp plates 200, 300 being so arranged, each of the first and second braking surfaces 240, 340 of the first and second ball-ramp plates 200, 300 is opposed to a respective first and second stationary braking structure 260, 360, wherein the first and second stationary braking structures 260, 360 may be associated with the housing 25 also housing the first and second ball-ramp plates 200, 300 therein. The first and second braking surfaces 220, 320 may comprise or have applied thereto a braking material or other friction material which, when urged against and engaged with the respective braking structures 260, 360, prevents or limits relative sliding motion therebetween.

More particularly, in some instances, the first and second ball-ramp surfaces 220, 320 of the first and second ball-ramp plates 200, 300 are configured to define corresponding ramped indentations 750 radially spaced apart from the input shaft 600, wherein the ramped indentations 750 are configured to receive the ball 400 therebetween. With the ball 400 disposed between the indentations 750, a spring 500 is arranged to bias the first ball-ramp plate 200 toward the second ball-ramp plate 300. The biasing of first ball-ramp plate 200 by the spring 500 thus spaces the first braking surface 240 apart from the first stationary braking structure 260, and promotes the retention of the ball 400 within and between the indentations 750.

Figure 2A:
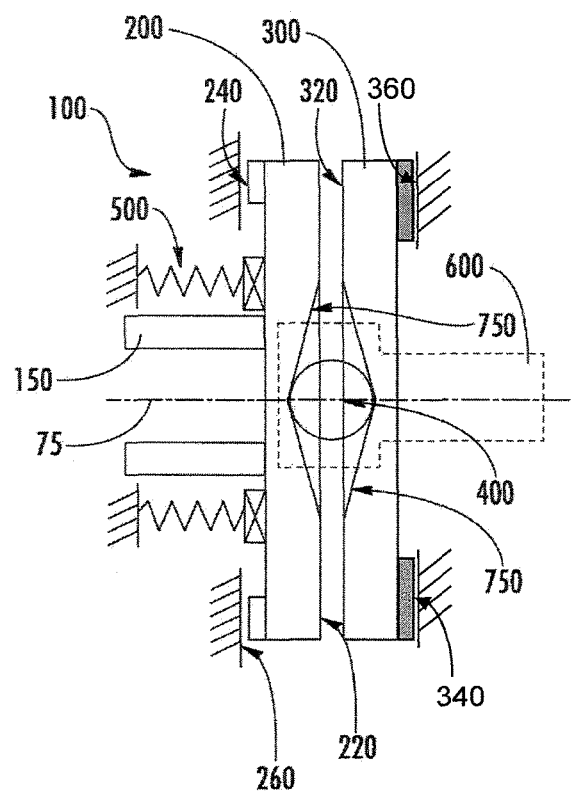
Figure 2B:
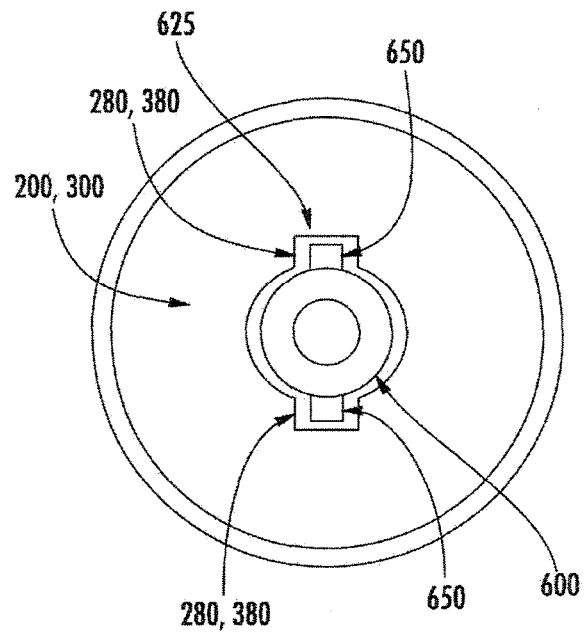
Figure 3:
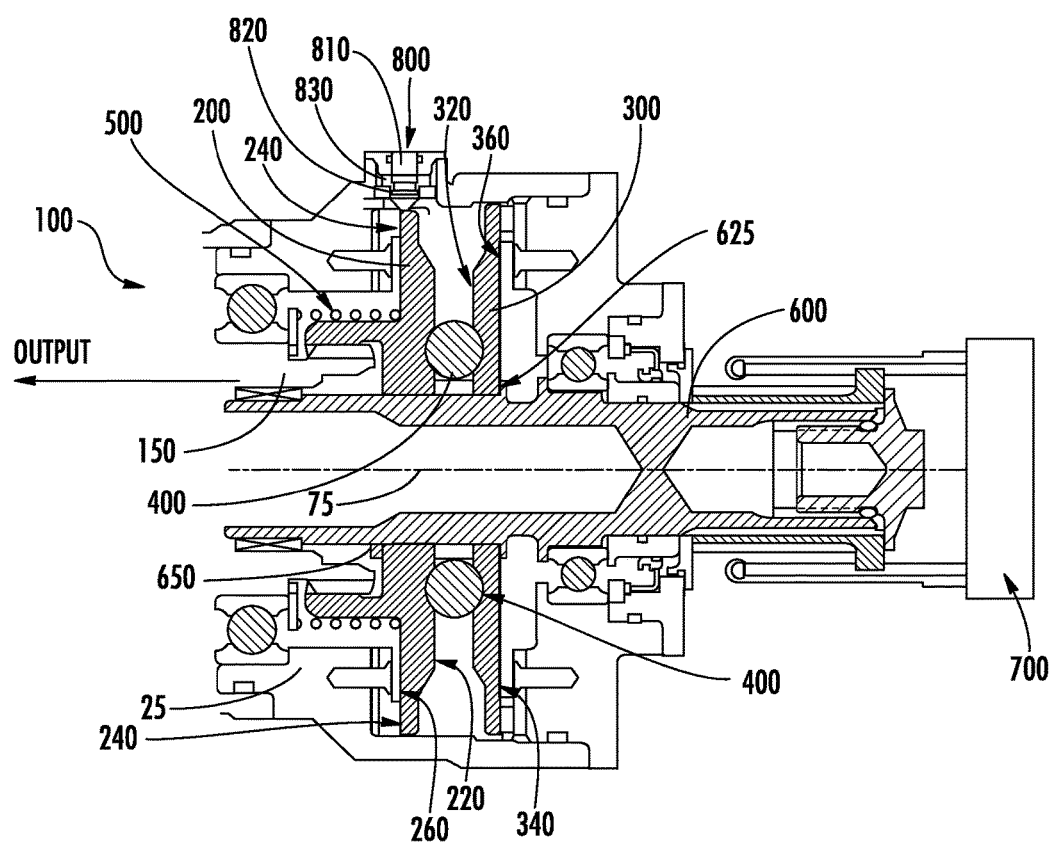
Figure 4:
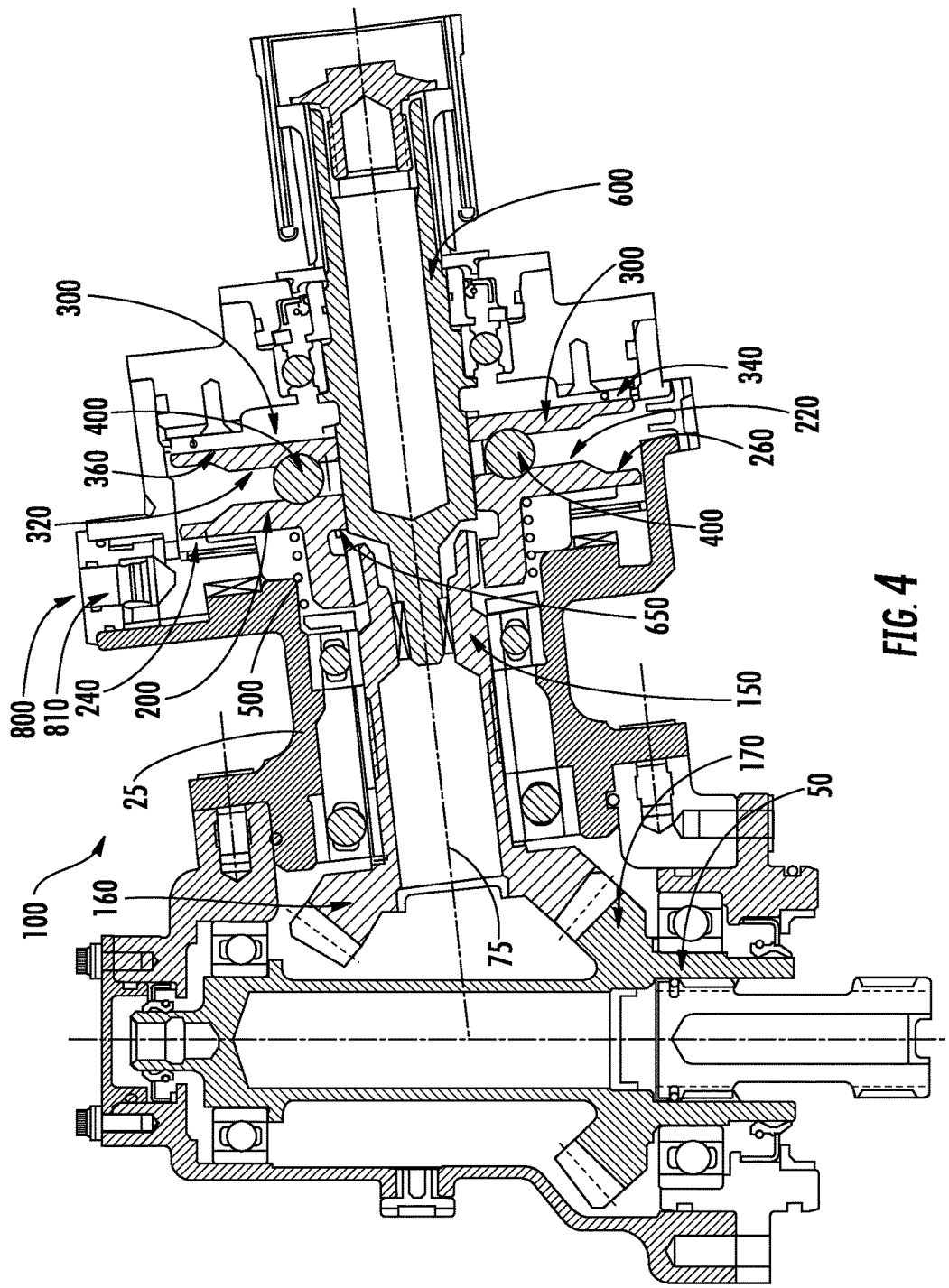

In some aspects, an input shaft 600, opposed to the output coupling 150, extends along the rotation axis 75 through hubs defined by the first and second ball-ramp plates 200, 300 and interact in a lost window arrangement 625 therewith (see, e.g., FIGS. 2A and 2B). In some aspects, the output coupling 150 and the first ball-ramp plate 200 are configured to be axially movable along the rotation axis 75 with respect to the output shaft 50 and the input shaft 600. Further, the output coupling 150 may comprise or be in communication with a bevel gear 160 adapted to be coupled to a corresponding bevel gear 170 engaged with the output shaft 50 as shown, for example, in FIG. 4.

In addition, in some instances, a drive motor 700 (see, e.g., FIG. 3) may be engaged with the input shaft 600, the drive motor 700 being configured to rotate the input shaft about the rotation axis 75. The drive motor 700 is thus arranged to provide a rotational torque on the input shaft 600, whether in a rotational direction to drive the input shaft 600 to deploy the flap, or in an opposite rotation direction for retracting the flap. This rotation torque from the drive motor 700 is transmitted to the input shaft 600 and then to the output coupling 150/output shaft 50 by way of the lost window arrangement 625 with the first and second ball-ramp plates 200, 300.

In one aspect, the lost window arrangement 625 includes a key 650 extending axially along the input shaft 600, and radially protruding therefrom, with the key 650 being received by a keyway 280, 380 defined by each of the first and second ball-ramp plates 200, 300, upon the input shaft 600 being engaged therewith. Accordingly, interaction of the key 650 with the keyways 280, 380 upon rotation of the input shaft 600, in turn, causes rotation of the first and second ball-ramp plates 200, 300.

The rotation of the first ball-ramp plate 200 via the lost window arrangement 625, further in turn, causes rotation of the output coupling 150 and the output shaft 50 engaged therewith. In this manner, the input shaft 600 can be used to deploy and retract the flap in communication with the output shaft 50. More particularly, in regard to the lost window arrangement 625, with the first and second ball-ramp plates 200, 300 being disposed adjacent to each other within the housing 25, the key 650 may extend axially along the input shaft 600 for at least the combined width of the first and second ball-ramp plates 200, 300 and the distance therebetween (i.e., the separation distance being determined by the ball 400 disposed within opposed indentations 750.

In some instances, the key 650 may extend further in the axial direction to also include the distance which the first ball-ramp plate 200 is movable for the first braking surface 240 to engage the first stationary structure 260. In addition, each keyway 280, 380 defined by the respective one of the first and second ball-ramp plates 200, 300 may have an angular dimension greater than the angular dimension of the key 650, so as to allow rotation of the input shaft 600 with respect to the first and second ball-ramp plates 200, 300. That is, as shown, for example, in FIG. 2B, the relatively lager angular dimension (i.e., width) of the keyway 280, 380 with respect to the key 650, allows certain rotation of the first and second ball-ramp plates 200, 300 with respect to the input shaft 600 (i.e., a dwell angle). Normally, due to the spring 500 biasing the first ball-ramp plate 200 toward the second ball-ramp plate 300, while maintaining the ball 400 in the indentations 750, both of the ball-ramp plates 200, 300 rotate concurrently with the input shaft 600, when the absolute value of the rotational torque applied to the output coupling 150 by blow back of the flap is not greater than the rotational torque applied to the input shaft 600.

In one aspect, the lost window arrangement 625, as shown, for example, in FIG. 2B, is further configured such that an absolute value of a rotational torque applied to the output coupling 150 by blow back of the flap, greater than a rotational torque applied to the input shaft 600, causes the ball 400 to urge apart the first and second ball-ramp surfaces 220, 320, and to overcome the biasing of the spring 500. That is, in certain instances, when the flap is extended and the aircraft is in flight, the tendency is for airflow over the wing to exert a force on the flap back toward the retracted position (i.e., a "blow back force").

This reverse or retraction "blow back" force exerted on the flap, in turn, exerts a rotational force on the output shaft 50 that is the reverse of the rotation of the output coupling 150 used to deploy the flap. Accordingly, if the flap is in the process of being deployed or retracted, and the absolute value of that "blow back" force exerted on the flap is greater than the torque applied to the input shaft 600 (i.e., in the event of an operational issue with the main no-back 6 of the outboard GRA 3, combined with a disconnect of a torque tube 7 disposed inboard of the inboard GRA 4 (see, e.g., FIG. 1B)), the blow back force will cause the reverse rotation of the output shaft 50 to be transmitted to the output coupling/first ball-ramp late 200 of the blow back prevention device 100. This reverse rotation of the output coupling 150/first ball-ramp plate 200, with respect to the second ball-ramp plate 300, due to the dwell associated with the lost window configuration thus causes angular misalignment of the indentations 750 of the first and second ball-ramp surfaces 220, 320 which, in turn, causes the ball 400 to be moved along the ramped surfaces of the indentations 750 against and overcoming the biasing of the spring 500.

The ball 400 moving along the ramped surfaces of the indentations 750 thus causes the first and second ball-ramp plates 200, 300 to be urged apart. As such, in response to the ball 400 urging apart the first and second ball-ramp plates 200, 300, the first and second braking surfaces 240, 340 are urged against the respective first and second stationary structures 260, 360 to cease rotation of the output coupling 150, wherein this reverse rotation of the output coupling 150 is due to the rotational torque applied thereto by blow back of the flap via the output shaft 50. That is, engagement of the braking material of the braking surfaces 220, 320 against the respective braking structures 260, 360, prevents or limits further rotation of either of the first and second ball-ramp plates 200, 300 with respect to the input shaft 600.

In some aspects, the blow back prevention device 100 may further comprise an actuation indicator 800 (see, e.g., FIGS. 3-5) coupled to the housing 25 and configured and arranged to provide an indicium of the actuation/operation of the blow back prevention device 100. More particularly, the actuation indicator 800 may be configured to interact with and be actuated by the first ball-ramp plate 200 and/or the output coupling 150, on engagement between the first braking surface 240 and the first stationary structure 260 to cease rotation of the output coupling 150 due to the rotational torque applied thereto by blow back of the flap. Actuation of the actuation indicator 800 may thus provide an indicium of operation of the blow back prevention device 100. In particular instances, the actuation indicator 800, according to various aspects of the present disclosure, may be configured to provide a readily apparent indicium of issues with the flap system, which may have led to the blow back prevention device 100 to be actuated or otherwise implemented, without requiring a complex inspection procedure or disassembly of the device 100.

In one particular aspect, the actuation indicator 800 may comprise an indicator element 810 normally biased outwardly of the housing by a spring 820, and a retaining device 830 configured to normally retain the indicator element 810 in a retracted position with respect to the housing 25, the retaining device 830 being responsive to interaction with the first ball-ramp plate 200 to release the indicator element 810, as biased by the spring 820, to an actuated position outwardly of the housing 25. The indicator element 810 is preferably readily visible in the actuated position, and is otherwise configured to remain in the actuated position, once actuated, to provide the indicium of actuation of device 100. The actuation indicator 800 may otherwise be configured to be resettable via manual return of the indicator element 810 to the retracted position, against the biasing of the spring 820, for retention by the retaining device 830, once the first and second ball-ramp plates 200, 300 have also been reset with respect to each other to bring the indentations 750 back into registration with each other.

Resetting the ball ramp plates 200, 300 with respect to each other may be accomplished, for example, by actuating the input shaft 600 to rotate in the deployment direction, wherein the subsequent interaction between the key 650 and the keyways 280, 380 causes the ball-ramp plates 200, 300 to rotate with respect to the input shaft 600 and re-align with each other such that the indentations 750 are again in registration and with the ball 400 again being received therein. Once reset, the spring 500 again biases the first ball-ramp plate 200 toward the second ball-ramp plate 300 to retain the ball 400 within the indentations 750, such that the device 100 is again functional.

As will be appreciated by one skilled in the art, the aspects of a blow back prevention device 100 as disclosed herein may include other elements necessary for mounting the ball-ramp plates and other components within the housing 25 such as, for example, shafts, bearings, shims, fasteners, etc. As such, it will be understood that the various aspects of a blow back prevention device 100 disclosed herein will include any combination of such other elements required for the blow back prevention device 100 to accomplish the purposes and functions related to those aspects, even though such other elements may not be expressly described in conjunction with those aspects. Further, as shown in FIG. 5, aspects of a passive supplemental blow back prevention device 100, as disclosed herein, may be implemented in place of a conventional half system no-back in a trailing edge flap system of the type described herein.

FIG. 6 schematically illustrates a method of manufacturing a blow back prevention device 100 for a trailing edge of an aircraft flap, wherein such a method comprises disposing a first ball-ramp plate 200 adjacent to a second ball-ramp plate 300 within a housing 25, wherein the first ball-ramp plate 200 is engaged with an output coupling 150, adapted to receive a rotatable output shaft 50, and rotatable therewith about a longitudinal rotation axis 75, with the first and second ball-ramp plates 200, 300 having respective first and second ball-ramp surfaces 220, 320 and opposed respective first and second braking surfaces 240, 340, such that the first and second ball-ramp surfaces 220, 320 are opposed to each other, and such that each of the first and second braking surfaces 240, 340 is opposed to a respective first and second stationary braking structure 260, 360 associated with the housing 25 (Block 900).

A ball 400 is disposed between the first and second ball-ramp surfaces 220, 320 (Block 920), and a spring 500 is engaged in communication with the first ball-ramp plate 200 to bias the first ball-ramp plate 200 toward the second ball-ramp plate 300, and to space apart the first braking surface 240 from the first stationary braking structure 260 (Block 940). An input shaft 600 is arranged along the rotation axis 75, in opposition to the output coupling 150, to extend through the first and second ball-ramp plates 200, 300 in a lost window arrangement 625 therewith, wherein the lost window arrangement 625 is configured such that an absolute value of a rotational torque applied to the output coupling 150 by blow back of the flap, greater than a rotational torque applied to the input shaft 600, causes the ball 400 to urge apart the first and second ball-ramp surfaces 220, 320, and overcome the biasing of the spring 500, such that the first and second braking surfaces 240, 340 are urged against the respective first and second stationary structures 260, 360 to cease rotation of the output coupling 150 due to the rotational torque applied thereto by blow back of the flap (Block 960). Other aspects and/or steps of such a method of manufacturing a blow back prevention device are otherwise disclosed in connection with the disclosure of the various embodiments and aspects of a blow back prevention device otherwise addressed herein.

Aspects of the present disclosure thus provide a supplemental blow back prevention device, for example, for a trailing edge flap system, and an associated method of manufacture thereof. Such a device and associated method may allow the realization of improvements that address issues with conventional blow back prevention devices such as, for example, smaller size/greater compactness, reduced weight, reduced complexity and/or reduced number of components, lower cost, passive/self-resettable operation, and capability of providing an indicium of issues with the trailing edge flap system without requiring a complex inspection procedure, any or all of which may be lacking in conventional arrangements using conventional blow back prevention devices Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. A blow back prevention device 100 for an aircraft flap, comprising:
    a first ball-ramp plate 200 engaged with an output coupling 150, the output coupling 150 being adapted to receive a rotatable output shaft 50, and rotatable therewith about a longitudinal rotation axis 75, the first ball-ramp plate 200 having a first ball-ramp surface 220 and an opposed first braking surface 240;
    a second ball-ramp plate 300 having a second ball-ramp surface 320 and an opposed second braking surface 340, and being disposed adjacent to the first ball-ramp plate 200 such that the first and second ball-ramp surfaces 220, 320 are opposed to each other, and include a ball 400 disposed therebetween, and such that each of the first and second braking surfaces 240, 340 is opposed to a respective first and second stationary braking structure 260, 360;
    a spring 500 biasing the first ball-ramp plate 200 toward the second ball-ramp plate 300, to space the first braking surface 240 apart from the first stationary braking structure 260; and
    an input shaft 600 opposed to the output coupling 150 and extending along the rotation axis 75 through the first and second ball-ramp plates 200, 300, the first and second ball-ramp plates 200, 300, the ball 400, and the spring 500 being arranged such that an absolute value of a rotational torque applied to the output coupling 150 by blow back of the flap, greater than a rotational torque applied to the input shaft 600, causes the ball 400 to urge apart the first and second ball-ramp surfaces 220, 320, and overcome the biasing of the spring 500, such that the first and second braking surfaces 240, 340 are urged against the respective first and second stationary structures 260, 360 to cease rotation of the output coupling 150 due to the rotational torque applied thereto by blow back of the flap.

2. The device of claim 1, comprising a key 650 extending axially along the input shaft 600, and radially protruding therefrom, the key 650 being received by a keyway 280, 380 defined by each of the first and second ball-ramp plates 200, 300, each keyway 280, 380 having an angular dimension greater than an angular dimension of the key 650, so as to allow rotation of the input shaft 600 with respect to the first and second ball-ramp plates 200, 300.

3. The device of claim 1, wherein the output coupling 150 and the first ball-ramp plate 200 are configured to be axially movable along the rotation axis 75 with respect to the output shaft 50 and the input shaft 600.

4. The device of claim 1, wherein the first and second ball-ramp surfaces 220, 320 of the first and second ball-ramp plates 200, 300 are configured to define corresponding ramped indentations radially spaced apart from the input shaft 600, the ramped indentations being configured to receive the ball 400 therebetween, the ball 400 being retained between the indentations by the biasing of the first ball-ramp plate 200 by the spring 500 when the absolute value of the rotational torque applied to the output coupling 150 by blow back of the flap is not greater than the rotational torque applied to the input shaft 600.

5. The device of claim 1, comprising a drive motor 700 engaged with the input shaft 600, the drive motor 700 being configured to rotate the input shaft about the rotation axis 75.

6. The device of claim 1, wherein the output coupling 150 comprises a bevel gear 160 adapted to be coupled to a corresponding bevel gear 170 engaged with the output shaft 50.

7. The device of claim 1, comprising an actuation indicator 800 coupled to the housing 25, the actuation indicator 800 being configured to interact with and be actuated by the first ball-ramp plate 200, on engagement between the first braking surface 240 and the first stationary structure 260 to cease rotation of the output coupling 150 due to the rotational torque applied thereto by blow back of the flap, so as to provide an indicium of operation of the blow back prevention device.

8. The device of claim 7, wherein the actuation indicator 800 comprises an indicator element 810 normally biased outwardly of the housing by a spring 820, and a retaining device 830 configured to normally retain the indicator element 810 in a retracted position with respect to the housing 25, the retaining device 830 being responsive to interaction with the first ball-ramp plate 200 to release the indicator element 810, as biased by the spring 820, to an actuated position outwardly of the housing 25.

9. The device of claim 8, wherein the actuation indicator 800 is configured to be resettable via manual return of the indicator element 810 to the retracted position, against the biasing of the spring 820, for retention by the retaining device 830.

10. A method of manufacturing a blow back prevention device 100 for a trailing edge of an aircraft flap, comprising:
  disposing a first ball-ramp plate 200 adjacent to a second ball-ramp plate 300 within a housing 25, the first ball-ramp plate 200 being engaged with an output coupling 150, adapted to receive a rotatable output shaft 50, and rotatable therewith about a longitudinal rotation axis 75, with the first and second ball-ramp plates 200, 300 having respective first and second ball-ramp surfaces 220, 320 and opposed respective first and second braking surfaces 240, 340, such that the first and second ball-ramp surfaces 220, 320 are opposed to each other, and such that each of the first and second braking surfaces 240, 340 is opposed to a respective first and second stationary braking structure 260, 360 associated with the housing 25;
  disposing a ball 400 between the first and second ball-ramp surfaces 220, 320;
  engaging a spring 500 in communication with the first ball-ramp plate 200 to bias the first ball-ramp plate 200 toward the second ball-ramp plate 300, and to space apart the first braking surface 240 from the first stationary braking structure 260; and
  arranging an input shaft 600 along the rotation axis 75, in opposition to the output coupling 150, to extend through the first and second ball-ramp plates 200, 300, with the first and second ball-ramp plates 200, 300, the ball 400, and the spring 500 being arranged such that an absolute value of a rotational torque applied to the output coupling 150 by blow back of the flap, greater than a rotational torque applied to the input shaft 600, causes the ball 400 to urge apart the first and second ball-ramp surfaces 220, 320, and overcome the biasing of the spring 500, such that the first and second braking surfaces 240, 340 are urged against the respective first and second stationary structures 260, 360 to cease rotation of the output coupling 150 due to the rotational torque applied thereto by blow back of the flap.

11. The method of claim 10, wherein arranging an input shaft 600 comprises arranging the input shaft 600 to extend through the first and second ball-ramp plates 200, 300, with a key 650 extending axially along the input shaft 600, and radially protruding therefrom, such that the key 650 is received by a keyway 280, 380 defined by each of the first and second ball-ramp plates 200, 300, with each keyway 280, 380 having an angular dimension greater than an angular dimension of the key 650, so as to allow rotation of the input shaft 600 with respect to the first and second ball-ramp plates 200, 300.

12. The method of claim 10, wherein disposing a first ball-ramp plate 200 comprises disposing the first ball-ramp plate 200 adjacent to the second ball-ramp plate 300 within the housing 25, such that the output coupling 150 and the first ball-ramp plate 200 are axially movable along the rotation axis 75 with respect to the output shaft 50 and the input shaft 600.

13. The method of claim 10, wherein the first and second ball-ramp surfaces 220, 320 of the first and second ball-ramp plates 200, 300 are configured to define corresponding ramped indentations radially spaced apart from the input shaft 600, and wherein disposing a first ball-ramp plate 200 adjacent to a second ball-ramp plate 300 comprises inserting the ball between the ramped indentations such that the ball 400 is retained between the indentations by the biasing of the first ball-ramp plate 200 by the spring 500 when the absolute value of the rotational torque applied to the output coupling 150 by blow back of the flap is not greater than the rotational torque applied to the input shaft 600.

14. The method of claim 10, comprising engaging a drive motor 700 with the input shaft 600, the drive motor 700 being configured to rotate the input shaft about the rotation axis 75.

15. The method of claim 10, comprising coupling a bevel gear 160 associated with the output coupling 150 with a corresponding bevel gear 170 engaged with the output shaft 50.

16. The method of claim 10, comprising coupling an actuation indicator 800 to the housing 25, the actuation indicator 800 being configured to interact with and be actuated by the first ball-ramp plate 200, on engagement between the first braking surface 240 and the first stationary structure 260 to cease rotation of the output coupling 150 due to the rotational torque applied thereto by blow back of the flap, so as to provide an indicium of operation of the blow back prevention device.

17. The method of claim 16, wherein the actuation indicator 800 comprises an indicator element 810 normally biased outwardly of the housing by a spring 820, and a retaining device 830 configured to normally retain the indicator element 810 in a retracted position with respect to the housing 25, and wherein coupling the actuation indicator 800 to the housing 25 comprises coupling the actuation indicator 800 to the housing 25 such that the retaining device 830 is arranged to be responsive to interaction with the first ball-ramp plate 200 to release the indicator element 810, as biased by the spring 820, to an actuated position outwardly of the housing 25.

18. The method of claim 17, wherein coupling the actuation indicator 800 to the housing 25 comprises coupling the actuation indicator 800 to the housing 25 such that the actuation indicator 800 is resettable via manual return of the indicator element 810 to the retracted position, against the biasing of the spring 820, for retention by the retaining device 830.

* * * * *